United States Patent
Zhang et al.

(10) Patent No.: US 12,277,007 B2
(45) Date of Patent: Apr. 15, 2025

(54) FLEXIBLE SUPPORT LAYER, FLEXIBLE DISPLAY MODULE AND FLEXIBLE DISPLAY DEVICE

(71) Applicant: BOE Technology Group Co., Ltd., Beijing (CN)

(72) Inventors: Chong Zhang, Beijing (CN); Baofeng Sun, Beijing (CN); Linlin Xu, Beijing (CN); Shangchieh Chu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/802,977

(22) PCT Filed: Nov. 19, 2021

(86) PCT No.: PCT/CN2021/131687
§ 371 (c)(1),
(2) Date: Aug. 29, 2022

(87) PCT Pub. No.: WO2022/199074
PCT Pub. Date: Sep. 29, 2022

(65) Prior Publication Data
US 2024/0192728 A1    Jun. 13, 2024

(30) Foreign Application Priority Data

Mar. 26, 2021   (CN) .......................... 202120620504.9

(51) Int. Cl.
*G06F 1/16* (2006.01)
*G09F 9/30* (2006.01)
*G09G 3/00* (2006.01)

(52) U.S. Cl.
CPC ............ *G06F 1/1652* (2013.01); *G09F 9/301* (2013.01); *G09G 3/035* (2020.08)

(58) Field of Classification Search
CPC ........ G09G 3/035; G09F 9/301; G06F 1/1652
See application file for complete search history.

(56) References Cited

U.S. PATENT DOCUMENTS 10,490,771 B2 * 11/2019 Kim ..................... H10K 50/844
10,727,435 B2 * 7/2020 Kim ..................... H05K 5/0017
(Continued)

FOREIGN PATENT DOCUMENTS

CN   108269497 A  *  7/2018  ........... G06F 1/1641
CN   110992828 A  *  4/2020  ............. B32B 3/266
(Continued)

OTHER PUBLICATIONS

International Search Report for PCT/CN2021/131687 Mailed Feb. 15, 2022.

*Primary Examiner* — Ricardo Osorio
(74) *Attorney, Agent, or Firm* — Ling Wu; Stephen Yang; Ling and Yang Intellectual Property

(57) ABSTRACT

A flexible support layer, a flexible display module and a flexible display device are provided. The flexible support layer includes at least two non-bending regions and at least one bending region connecting two adjacent non-bending regions, a bending region includes a first transition region connected with a non-bending region, the first transition region includes multiple first openings arranged at intervals, a density of the first openings in the first transition region gradually decreases along a direction close to the non-bending region.

20 Claims, 6 Drawing Sheets

(56) References Cited

U.S. PATENT DOCUMENTS

| | | | |
|---|---|---|---|
| 10,831,049 B2* | 11/2020 | Kim | G02F 1/133305 |
| 10,930,883 B2* | 2/2021 | Park | G06F 1/1641 |
| 10,976,873 B2* | 4/2021 | Shin | H04M 1/0268 |
| 10,985,333 B2* | 4/2021 | Kim | H01L 33/483 |
| 11,204,627 B2* | 12/2021 | Park | H04M 1/0268 |
| 11,503,727 B2* | 11/2022 | Seo | H05K 5/0217 |
| 2016/0357052 A1* | 12/2016 | Kim | G02F 1/133308 |
| 2020/0136066 A1 | 4/2020 | Jin | |
| 2020/0185641 A1 | 6/2020 | Jeong et al. | |
| 2020/0411777 A1* | 12/2020 | Seo | G06F 1/1652 |
| 2021/0165454 A1 | 6/2021 | Dong et al. | |
| 2022/0114923 A1* | 4/2022 | Ha | G06F 1/1616 |
| 2022/0151083 A1* | 5/2022 | Park | G06F 1/1652 |
| 2022/0155821 A1* | 5/2022 | Kim | G06F 1/1618 |
| 2022/0171440 A1* | 6/2022 | Lee | G06F 1/1624 |
| 2022/0343809 A1 | 10/2022 | Chen et al. | |
| 2023/0087236 A1* | 3/2023 | Han | G06F 1/1681 |
| | | | 345/173 |

FOREIGN PATENT DOCUMENTS

| | | | | |
|---|---|---|---|---|
| CN | 111445796 A | | 7/2020 | |
| CN | 111508370 A | | 8/2020 | |
| CN | 211928943 U | | 11/2020 | |
| CN | 212411484 U | | 1/2021 | |
| CN | 112436039 A | * | 3/2021 | G09F 9/301 |
| CN | 113380145 A | * | 9/2021 | |
| CN | 109860229 B | * | 6/2023 | H01L 27/3258 |
| KR | 20180121256 A | * | 11/2018 | |
| KR | 102392468 B1 | * | 4/2022 | |

\* cited by examiner

FLEXIBLE SUPPORT LAYER, FLEXIBLE DISPLAY MODULE AND FLEXIBLE DISPLAY DEVICE

CROSS-REFERENCE TO RELATED APPLICATIONS

The present application is a U.S. National Phase Entry of International Application PCT/CN2021/131687 having an international filing date of Nov. 19, 2021, which claims priority of Chinese patent application No. 202120620504.9, filed to CNIPA on Mar. 26, 2021 and entitled "Flexible Support Layer, Flexible Display Module and Flexible Display Device", and the contents disclosed in the above-mentioned application are hereby incorporated as a part of this application.

TECHNICAL FIELD

Embodiments of the present disclosure relate to, but are not limited to, the field of display technologies, and more particularly to a flexible support layer, a display module and a flexible display device.

BACKGROUND

With continuous development of display technology, foldable display terminals have become a development trend of electronic products. When a foldable display terminal is in a folded state, its area can be reduced, which is convenient for users to carry, and when it is unfolded, it has a larger display area and a better display effect.

At present, folding of a developed flexible display device is implemented by a rotating shaft, and a flexible support layer between a flexible display module and the rotating shaft is very important in the flexible display device, which not only ensures flatness of the flexible display module when it is folded or unfolded, but also meets stretchability of a bending form of the flexible display module.

The flexible support layer includes a non-bending region and a bending region, the bending region enables the flexible support layer to be folded, and the bending region has an opening for reducing a modulus of the flexible support layer. In a bending process of the flexible support layer, a problem of breakage will easily occur at a boundary between the bending region and the non-bending region, so as to reduce a service life of the product.

SUMMARY

The following is a summary of subject matter described herein in detail. The summary is not intended to limit the protection scope of claims.

In a first aspect, an embodiment of the present disclosure provides a flexible support layer, including at least two non-bending regions and at least one bending region connecting two adjacent non-bending regions, each bending region includes a first transition region connected with a non-bending region, the first transition region includes multiple first openings arranged at intervals, a density of the first openings in the first transition region gradually decreases along a direction close to the non-bending region.

In an exemplary implementation, the first openings are arranged at intervals along a first direction to form a first opening row, and multiple first opening rows are arranged along a second direction, wherein the second direction is a direction in which the bending region faces the non-bending region, and the second direction intersects the first direction, and a first interval is provided between two adjacent first openings in the first opening row, the first intervals in the same first opening row are identical, and the first intervals in each first opening row gradually increases along the second direction.

In an exemplary implementation, the first intervals in adjacent first opening rows are staggered from each other.

In an exemplary implementation, the bending region further includes a fixed region located at a side of the first transition region away from the non-bending region, and the non-bending region is the non-bending region connected with the first transition region.

In an exemplary implementation, the bending region further includes a pattern region located between the first transition region and the fixed region, the pattern region includes multiple second openings arranged at intervals, wherein a density of the second openings in the pattern region is the same along a direction close to the non-bending region.

In an exemplary implementation, the second openings are arranged at intervals along the first direction to form a second opening row, and multiple second opening rows are arranged along the second direction, a second interval is provided between two adjacent second openings in the second opening row, the second intervals in the same second opening row are identical, and the second intervals in each second opening row are identical along the direction close to the non-bending region.

In an exemplary implementation, the bending region further includes a second transition region located between the pattern region and the fixed region, the second transition region includes multiple third openings arranged at intervals, wherein a density of the third openings in the second transition region gradually decreases along a direction close to the fixed region.

In an exemplary implementation, the third openings are arranged at intervals along the first direction to form a third opening row, and multiple third opening row arranged along the direction close to the fixed region, a third interval is provided between two adjacent third openings in the third opening row, the third intervals in the same third opening row are identical, and the third intervals in each third opening row gradually increase along the direction close to the fixed region.

In an exemplary embodiment, an increment of the third intervals along the direction close to the fixed region is greater than an increment of the first intervals along the second direction.

In an exemplary implementation, a support post is provided in the fixed region.

In an exemplary implementation, an adhesive layer is disposed between the fixed region and the support post.

In an exemplary implementation, the first openings are in a groove structure.

In a second aspect, an embodiment of the present disclosure further provides a flexible display module, including any one of the flexible display support layers described above.

In a third aspect, an embodiment of the present disclosure further provides a flexible display device, including any one of the flexible display modules described above.

Other aspects may be comprehended upon reading and understanding of the drawings and detailed descriptions.

DETAILED DESCRIPTION

The embodiments of the present disclosure will be described in detail below with reference to the drawings. It is to be noted that implementation modes may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict.

In the specification, for convenience, wordings indicating directional or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions in which the constituent elements are described. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the present disclosure, "about" refers to that a boundary is defined not so strictly and numerical values within process and measurement error ranges are allowed.

Figure 1:
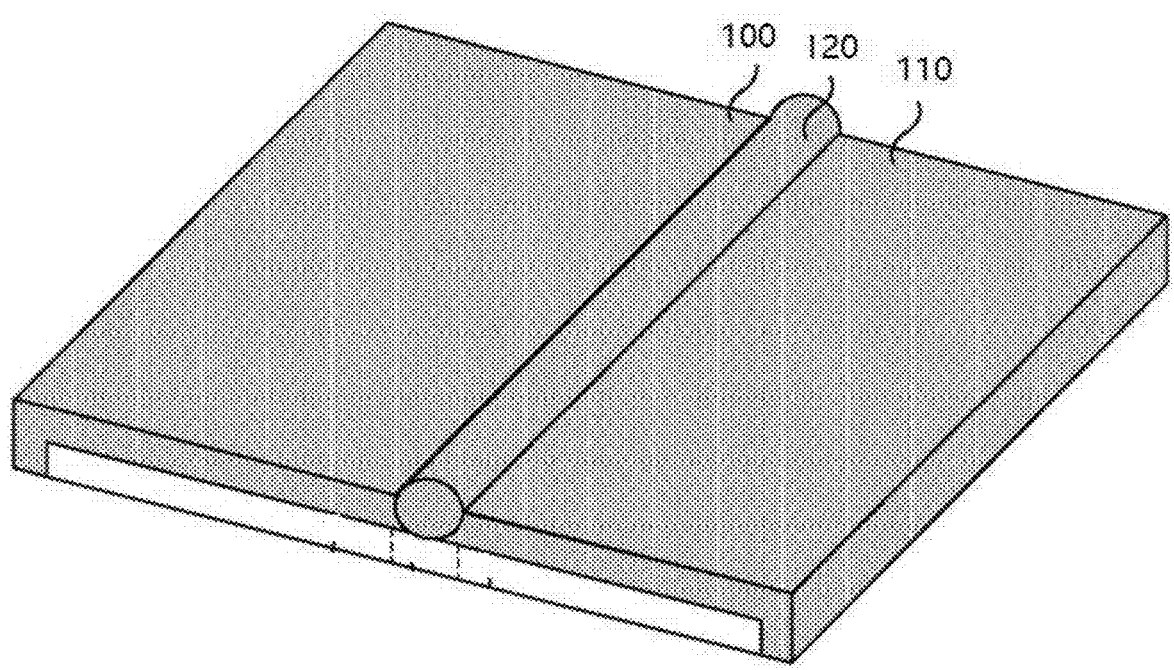
FIG. 1 is a schematic diagram of a structure of a flexible display device according to an embodiment of the present disclosure.

FIG. 1 is a schematic diagram of a structure of a flexible display device according to an embodiment of the present disclosure. As shown in FIG. 1, the flexible display device according to the embodiment of the present disclosure includes a first housing 100, a second housing 110 and a rotating shaft 120. The first housing 100 and the second housing 110 are located at two sides of the rotating shaft 120 and are rotationally connected through the rotating shaft 120. The first housing 100 and the second housing 110 can be rotated about the rotating shaft 120, respectively, such that folding and unfolding of the flexible display device can be realized.

In an exemplary embodiment, structures of the first housing 100 and the second housing 110 may be the same to form a display device with a symmetrical structure, and the first housing 100 and the second housing 110 may also be made into different structures as required.

Figure 2:
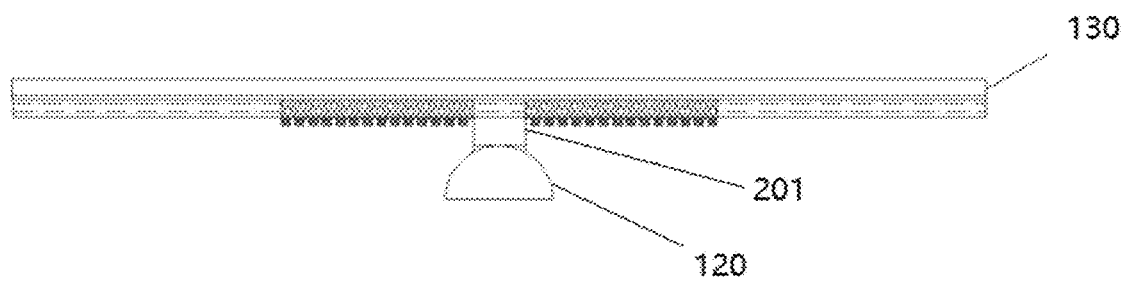
FIG. 2 is a first schematic diagram of a structure of a flexible display module in an unfolded state according to an embodiment of the present disclosure.
Figure 3:
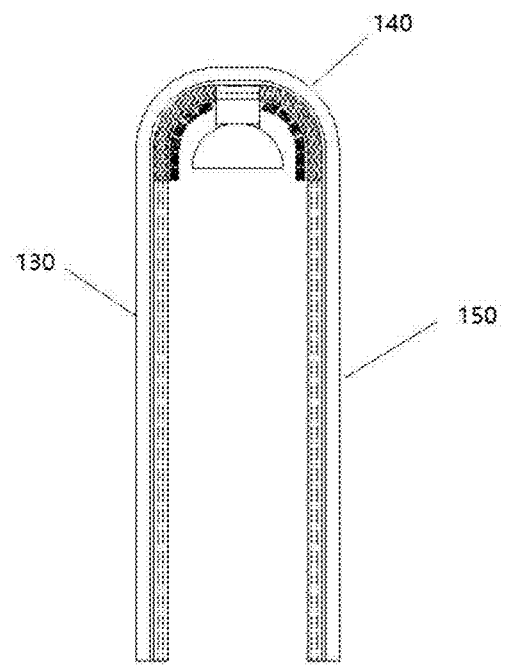
FIG. 3 is a schematic diagram of a structure of a flexible display device in an inward folded state according to an embodiment of the present disclosure.
Figure 4:
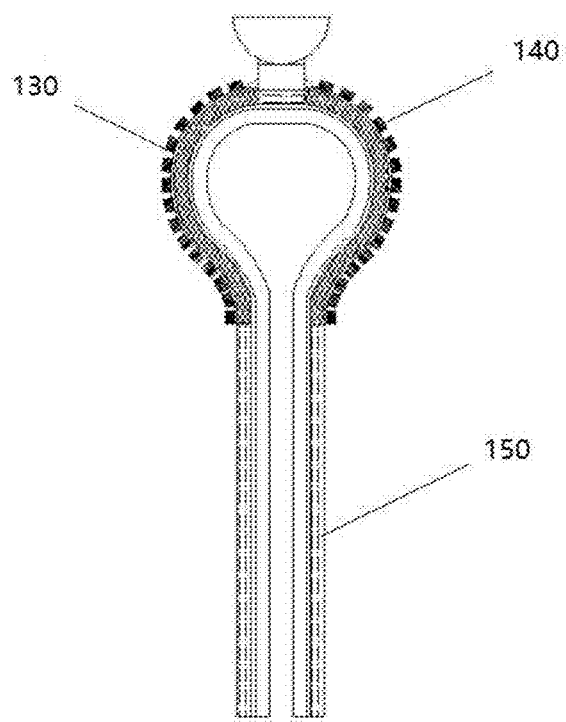
FIG. 4 is a schematic diagram of a structure of a flexible display device in an outward folded state according to an embodiment of the present disclosure.

FIG. 2 is a schematic diagram of a structure of a flexible display module in an unfolded state according to an embodiment of the present disclosure. FIG. 3 is a schematic diagram of a structure of a flexible display device in an inward folded state according to an embodiment of the present disclosure. FIG. 4 is a schematic diagram of a structure of a flexible display device in an outward folded state according to an embodiment of the present disclosure. In an exemplary embodiment, as shown in FIG. 2, FIG. 3 and FIG. 4, the flexible display device according to the embodiment of the present disclosure may further include a flexible display module 130 for displaying imagines. For example, the flexible display module 130 may be a flexible organic light emitting diode (OLED) display panel. The flexible OLED display panel includes a flexible substrate, a material of the flexible substrate is, for example, polyimide (PI), and an OLED device disposed on the flexible substrate. The OLED device can achieve self-luminescence, and the display device with the OLED display panel does not need to be provided with a backlight source. When the material of the substrate of the OLED display panel is a flexible material, the above OLED display panel can be bent.

The flexible display module 130 includes a bending region 140 and non-bending regions 150 located at two sides of the bending region 140. The first housing 100 and the second housing 110 are respectively connected with the non-bending regions 150 at two sides of the bending region 140, and the rotating shaft 120 is connected with the bending region 140. When the flexible display module is folded from the unfolded state, the flexible display module can be bent along the bending region 140.

In an exemplary embodiment, as shown in FIG. 3 and FIG. 4, bent states of the foldable display device include an inward folded state and an outward folded state. Herein, the outward folded state refers to that a display side of the flexible display module 130 is at the outer side after the flexible display module 130 is bent; on the contrary, the inward folded state refers to that the display side of the flexible display module 130 is at the inner side after the flexible display module 130 is bent, so as to effectively protect the flexible display module 130 from external impact when the flexible display module is in the bent state, which reduces a risk of failure of the flexible display module 130. When the flexible display module 130 is in the bent state, the bent region 140 is bent in a shape of a water drop. The flexible display module according to this embodiment may realize 360-degree folding.

A side of the flexible display module 130 connected with the first housing 100 and a side of the flexible display module 130 connected with the second housing 110 are non-display sides of the flexible display module 130, and a side of the flexible display module 130 away from the first housing 100 and a side of the flexible display module 130 far away from the second housing 110 are display sides of the flexible display module 130.

The flexible display module includes a flexible support layer located at the non-display side of the flexible display module, and the flexible support layer is used to ensure reliability and support of the bending of the flexible display module. The flexible support layer includes two non-bending regions and a bending region connecting the two non-bending regions, and the two non-bending regions may be bent through the bending region. The bending region includes multiple openings arranged at intervals, and a density of the openings is uniform along a direction close to a non-bending region.

However, due to the openings in the bending region, a modulus of the bending region is less than that of a non-bending region, which leads to a problem of sudden strain change at a boundary between the bending region and the non-bending region. During a bending process of the flexible support layer, breakage will easily occur at the boundary between the bending region and the non-bending region, which reduces the service life of the product.

An embodiment of the present disclosure provides a flexible support layer, including at least two non-bending regions and at least one bending region connecting two adjacent non-bending regions. A bending region includes a first transition region connected with a non-bending region, the first transition region includes multiple first openings arranged at intervals, wherein a density of the first openings in the first transition region gradually decreases along a direction close to a non-bending region. The density of the first openings refers to an area occupied by the first openings in a unit area of the first transition region. When the dimensions of the first openings are the same, the density of the first openings refers to the number of the first openings per unit area of the first transition region.

In the flexible support layer according to the embodiment of the present disclosure, the first transition region is arranged in the bending region, such that the density of the first openings in the first transition region is gradually reduced along the direction close to the non-bending region, thereby the modulus of the first transition region is gradually increased along the direction close to the non-bending region, and safety of the flexible support layer during bending is improved.

Figure 5:
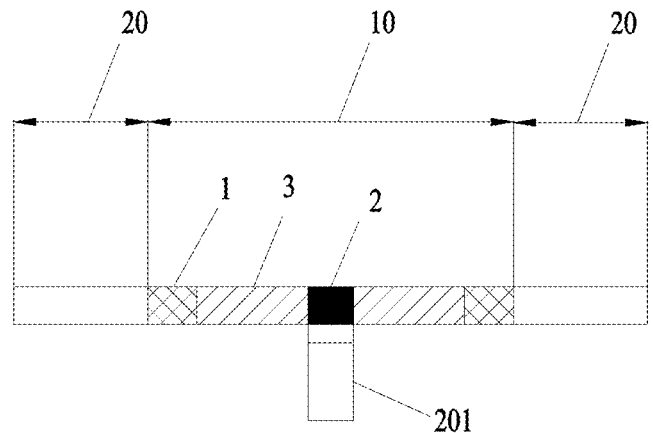
FIG. 5 is a first schematic diagram of a structure of a flexible support layer according to an embodiment of the present disclosure.
Figure 6:
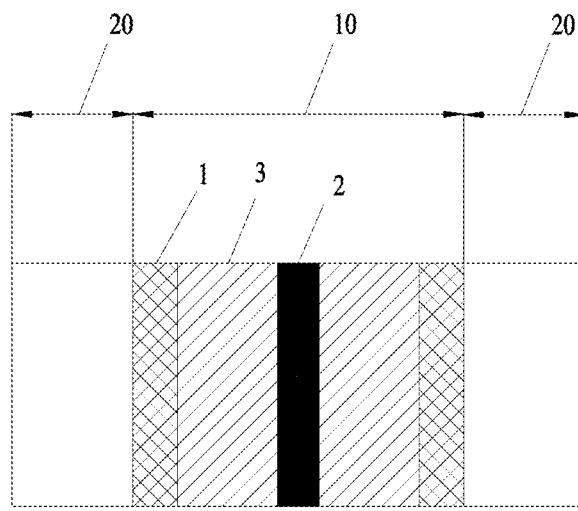
FIG. 6 is a top view of a flexible support layer according to an embodiment of the present disclosure.
Figure 7:
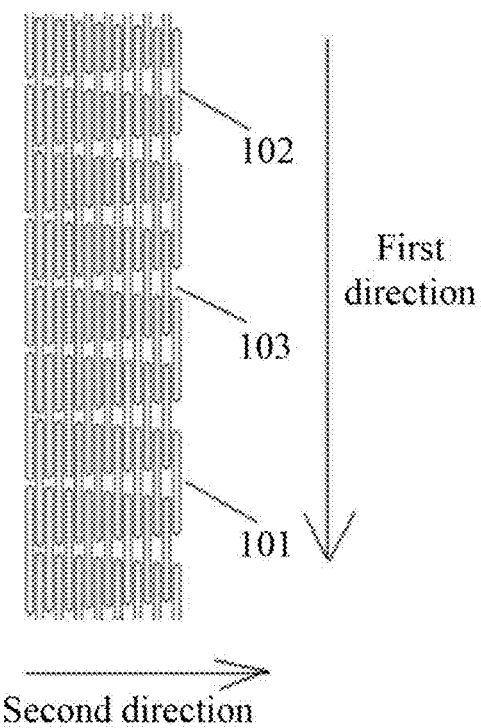
FIG. 7 is a schematic diagram of a structure of a first transition region in a flexible support layer according to an embodiment of the present disclosure.

FIG. 5 is a first schematic diagram of a structure of a flexible support layer according to an embodiment of the present disclosure. FIG. 6 is a top view of a flexible support layer according to an embodiment of the present disclosure. FIG. 7 is a schematic diagram of a structure of a first transition region in a flexible support layer according to an embodiment of the present disclosure. As shown in FIG. 5, FIG. 6 and FIG. 7, the flexible support layer according to the embodiment of the present disclosure includes at least two non-bending regions 20 and at least one bending region 10 connecting two adjacent non-bending regions 20. A bending region 10 includes a first transition region 1 connected with a non-bending region 20, the first transition region 1 includes multiple first openings 101 arranged at intervals, wherein a density of the first openings 101 in the first transition region 1 gradually decreases along a direction close to the non-bending region 20, such that a modulus of the bending region 10 at the side close to the non-bending region 20 gradually increases along the direction close to the non-bending region 20, thus solving the problem of a sudden strain change at a boundary between the bending region 10 and the non-bending region 20.

In an exemplary embodiment, as shown in FIG. 7, the first openings 101 are arranged at intervals along a first direction to form a first opening row 102. Multiple first opening rows 102 are arranged along the second direction. A second direction is a direction in which the bending region faces the non-bending region, and the second direction intersects with the first direction. The first direction may be a direction parallel to the rotating shaft. A first interval 103 is provided between two adjacent first openings 101 in the first opening row 102, the first intervals 103 between the first openings 101 in the same first opening row 102 are identical, and the first intervals 103 in the adjacent first opening rows 102 are staggered with each other. The first intervals 103 in each of the first opening rows 102 gradually increase along the second direction, the first intervals 103 in different first opening rows 102 are different, and a first interval 103 in a first opening row 102 close to the non-bending region is greater than a first interval 103 in a first opening rows 102 away from the non-bending region, such that the density of the first opening 101 in the first transition region 1 gradually decreases along the direction close to the non-bending region 20. For example, the first intervals 103 in each first opening row 102 decrease by 0.1 mm layer by layer along the second direction, the first interval 103 in the first opening row 102 close to the non-bending region 20 is 0.9 mm, and the first opening 101 is 3.2 mm in length and 0.2 mm in width.

In an exemplary implementation, the first opening 101 is in a groove structure and the groove structure is disposed along the first direction.

In an exemplary implementation, as shown in FIG. 5 and FIG. 6, the bending region 10 further includes a fixed region 2, wherein the fixed region 2 is located at a side of the first transition region 1 away from the non-bending regions 20. The non-bending regions 20 are non-bending regions 20 connected with the first transition region 1. The fixed region 2 is a solid region without openings. The fixed region is used for fixed connection with the rotating shaft, and when the flexible support layer is bent, the fixed region 2 is located on a center line of the bending region 10 parallel to the rotating shaft.

In an exemplary implementation, as shown in FIG. 2 and FIG. 5, the fixed region 2 is provided with a support post 201, the rotating shaft 120 is correspondingly provided with a fixing hole, and the support post 201 is inserted into the fixing hole and fixed with the rotating shaft 120, such that attachment between the flexible support layer and the rotating shaft 120 is better, the problem that the flexible display module bulges during the folding form conversion of the flexible display module is effectively solved, flatness of the flexible display module during folding and unfolding is ensured, and the safety of the flexible display module during bending is improved.

In an exemplary implementation, an adhesive layer is disposed between the fixed region and the support post, and the adhesive layer fixes the support post with the fixed region. The adhesive layer may be made of a hot melt adhesive material.

Figure 8:
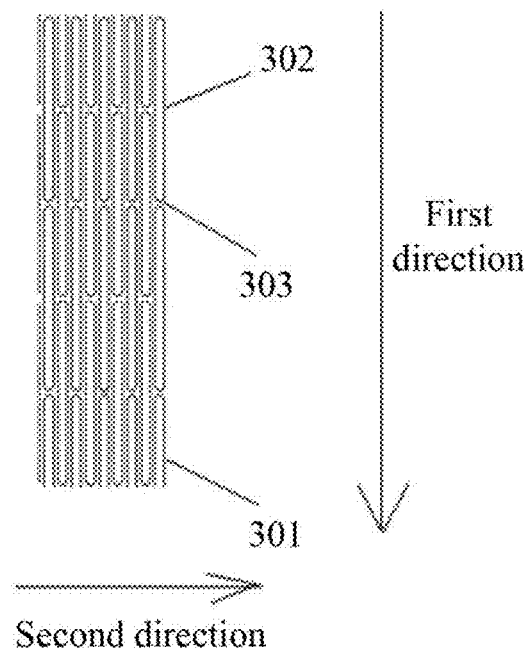
FIG. 8 is a schematic diagram of a structure of a pattern region in a flexible support layer according to an embodiment of the present disclosure.

FIG. 8 is a schematic diagram of a structure of a pattern region in a flexible support layer according to an embodiment of the present disclosure. In an exemplary implementation, as shown in FIG. 5, FIG. 6 and FIG. 8, the bending region 10 further includes a pattern region 3, wherein the pattern region 3 is located between the first transition region 1 and the fixed region 2, the pattern region 3 includes multiple second openings 301 arranged at intervals, a density of the second openings 301 in the pattern region 3 is the same along the direction close to the non-bending region 20.

In an exemplary implementation, as shown in FIG. 8, the second openings 301 are arranged at intervals along a first direction to form a second opening row 302, and multiple second opening rows are arranged along a second direction, wherein the second direction is a direction in which the bending region 10 faces a non-bending region 20, and the second direction intersects with the first direction. The first direction may be a direction parallel to the rotating shaft. A second interval 303 is provided between two adjacent second openings 301 in the second opening row 302, the second intervals 303 in the same second opening row 302 are identical, and the second intervals 303 in adjacent second opening rows 302 are staggered with each other. The second intervals 303 in each second opening row 302 are identical along the second direction. For example, the second interval 303 in each second opening row 302 is 0.1 mm, and the second opening 301 is 3.2 mm in length and 0.2 mm in width.

Figure 9:
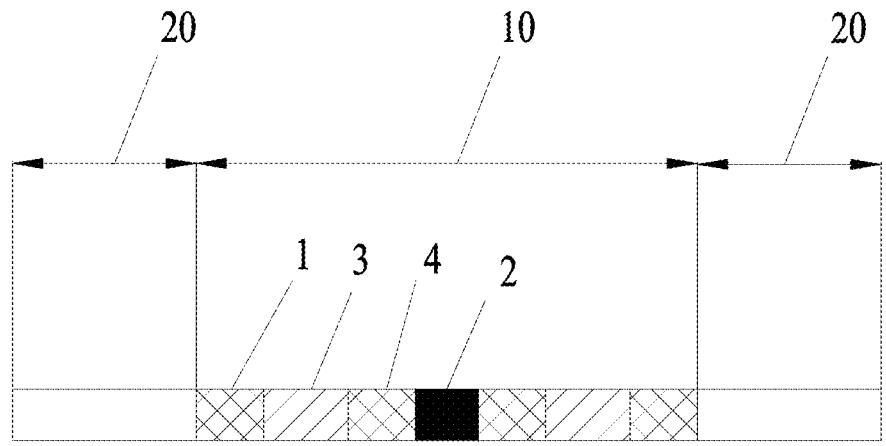
FIG. 9 is a second schematic diagram of a structure of a flexible support layer according to an embodiment of the present disclosure.
Figure 10:
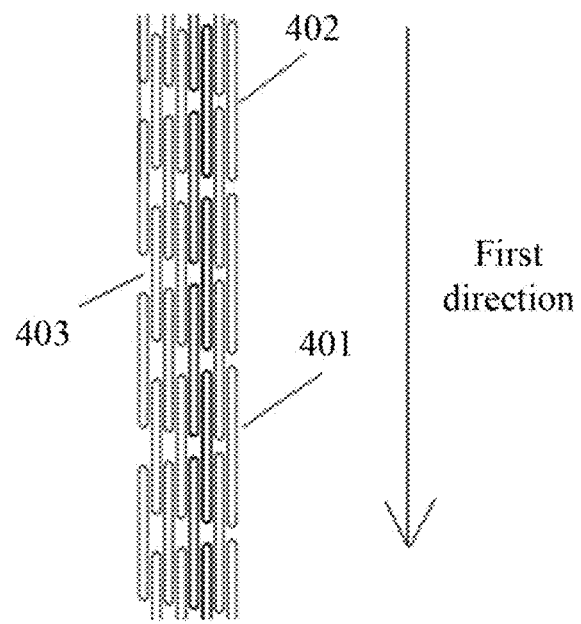
FIG. 10 is a schematic diagram of a structure of a second transition region in a flexible support layer according to an embodiment of the present disclosure.

FIG. 9 is a second schematic diagram of a structure of a flexible support layer according to an embodiment of the present disclosure. FIG. 10 is a schematic diagram of a structure of a second transition region in a flexible support layer according to an embodiment of the present disclosure. In an exemplary implementation, as shown in FIG. 9 and FIG. 10, the bending region 10 further includes a second transition region 4, wherein the second transition region 4 is located between the pattern region 3 and the fixed region 2. The second transition region 4 includes multiple third openings 401 arranged at intervals, wherein a density of the third openings 401 in the second transition region gradually decreases along a direction close to the fixed region 2. Thus, a modulus of the second transition region 4 gradually increases along the direction close to the fixed region 2, thereby avoiding the problem of sudden strain change at a boundary between the pattern region 3 and the fixed region 2.

In the exemplary implementation, as shown in FIG. 10, the third openings 401 are arranged at intervals along a first direction to form a third opening row 402, and multiple third openings 401 are arranged along the direction close to the fixing region 2. The first direction may be a direction parallel to the rotating shaft. A third interval 403 is arranged between two adjacent third openings 401 in the third opening row 402, the third intervals 403 in the same third opening row 402 are identical, and the third intervals 403 in adjacent third opening rows 402 are staggered from each other. The third intervals 403 in each third opening row 402 gradually increase along the direction close to the fixed region 2, the third intervals 403 in different third opening rows 402 are different, a third interval 403 in a third opening row 402 close to the fixed region 2 is larger than a third interval 403 in a third opening row 402 away from the fixed region 2. For example, the third intervals 403 in each third opening row 402 decrease by 0.1 mm layer by layer along the direction close to the fixed region 2, the third interval 403 in the third opening row 402 close to the fixed region 2 is 0.9 mm, and the third opening 401 is 3.2 mm in length and 0.2 mm in width.

Figure 11:
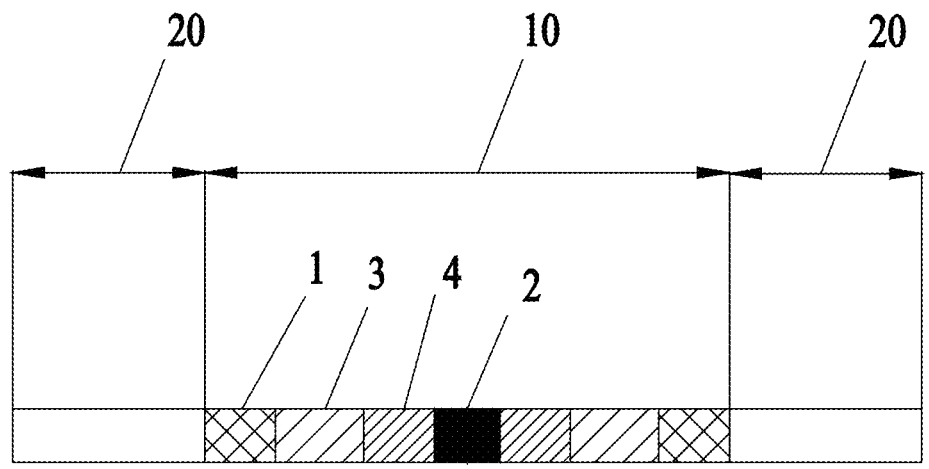
FIG. 11 is a third schematic diagram of a structure of a flexible support layer according to an embodiment of the present disclosure.

FIG. 11 is a third schematic diagram of a structure of a flexible support layer according to an embodiment of the present disclosure. As shown in FIG. 11, an increment of third intervals 403 in each third opening row 402 in the second transition region 4 along the direction close to the fixed region 2 is greater than the increment of the first intervals 103 in each first opening row 102 in the first transition region 1 along the direction close to the non-bending region 20. For example, the third intervals 403 in each third opening row 402 decrease by 0.2 mm layer by layer along the direction close to the fixed region 2, and the third interval 403 in the third opening row 402 close to the fixed region 2 is 0.9 mm.

Figure 12:
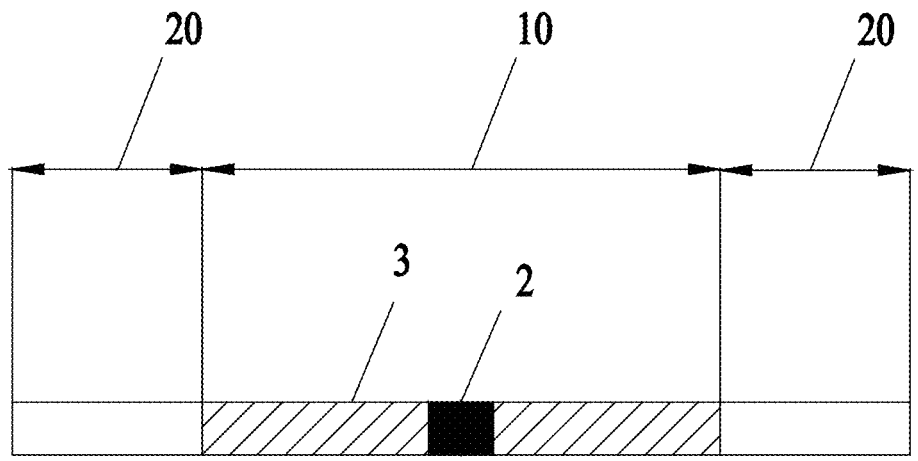
FIG. 12 is a schematic diagram of a structure of a flexible support layer.

FIG. 12 is a schematic diagram of a structure of a flexible support layer. As shown in FIG. 12, the flexible support layer includes at least two non-bending regions 20 and at least one bending region 10 connecting two adjacent non-bending regions 20, the bending region 10 includes a pattern region 3 and a fixed region 2. The pattern region 3 is located between the fixed region 2 and a non-bending region 20. The pattern region 3 includes multiple second openings arranged at intervals, wherein a density of the second openings in the pattern region 3 is the same along the direction close to the non-bending region 20.

The flexible display module includes a cover plate (Cover), an optical clear adhesive (OCA), a polarizer (POL), an adhesive layer (POL-PSA), a touch layer (FMLOC-OC), a silicon nitride layer (FMLOC-SiN), a first encapsulation layer (TFE3), a light emitting layer (IJP), a second encapsulation layer (TFE1), a flexible substrate (BP-PI), a back film adhesive (BP-PSA), a back film (BF), a protective film (Foam), a flexible support layer (Pattern region) and a foam layer (TPU). A simulation group BOE1 is formed by using the flexible support layer shown in FIG. 12 as the flexible support layer in the flexible display module described above, a simulation group BOE2 is formed by using the flexible support layer shown in FIG. 5 as the flexible support layer in the flexible display module described above, a simulation group BOE3 is formed by using the flexible support layer shown in FIG. 9 as the flexible support layer in the flexible display module described above, and a simulation group BOE4 is formed by adopting the flexible support layer shown in FIG. 11 as the flexible support layer in the flexible display module described above. Simulation experiments of inward folding R1.9 and outward folding R5 are carried out on the simulation groups BOE1 to BOE4, respectively, and the simulation results are shown in Table 1 and Table 2.

TABLE 1

Simulation results of inward folding R1.9

| Inward folding R1.9 | Normal strain/Maximum principle strain (%) | | | |
|---|---|---|---|---|
| | DOE1 (SUS1) | DOE2 (SUS2) | DOE3 (SUS3) | DOE4 (SUS4) |
| Cover | 1.4091 | 1.5639 | 1.5435 | 1.3159 |
| OCA | 130.14 | 129.43 | 130.73 | 130.85 |
| POL | 1.4526 | 1.5555 | 1.5014 | 1.3404 |
| POL-PSA | 167.9 | 163.66 | 171.29 | 171.65 |
| FMLOC-OC | 0.3149 | 0.3616 | 0.3371 | 0.3478 |
| FMLOC-SiN | 0.3785 | 0.3801 | 0.3624 | 0.3615 |
| TFE3 | 0.3467 | 0.28161 | 0.1968 | 0.1916 |
| IJP | 0.3163 | 0.3424 | 0.3072 | 0.3094 |

TABLE 1-continued

Simulation results of inward folding R1.9

| Inward folding R1.9 | Normal strain/Maximum principle strain (%) | | | |
|---|---|---|---|---|
| | DOE1 (SUS1) | DOE2 (SUS2) | DOE3 (SUS3) | DOE4 (SUS4) |
| TFE1 | 0.3424 | 0.2449 | 0.2273 | 0.2343 |
| BP-PI | 0.24 | 0.22 | 0.20 | 0.27 |
| BF-PSA (back film adhesive) | 182.64 | 187.05 | 203.03 | 196.78 |
| BF (back film) | 1.3135 | 1.3946 | 1.5333 | 1.4728 |
| Foam | 10.885 | 13.493 | 5.7576 | 6.1042 |
| Pattern region | 27.83 | −16.56 | −35.89 | 35.25 |
| TPU | 28.059 | 23.654 | 18.275 | 32.4485 |

TABLE 2

Simulation results of outward folding R5

| Outward folding R5 | Normal strain/Maximum principle strain (%) | | | |
|---|---|---|---|---|
| | DOE1 (SUS1) | DOE2 (SUS2) | DOE3 (SUS3) | DOE4 (SUS4) |
| Cover | 1.2707 | 1.2468 | 0.9813 | 1.2679 |
| OCA | 115.38 | 107.58 | 109.26 | 108.51 |
| POL | 0.9061 | 0.8459 | 0.6126 | 0.8768 |
| POL-PSA | 139.77 | 134.96 | 138.45 | 135.86 |
| FMLOC-OC | 0.1881 | 0.1607 | 0.1675 | 0.1687 |
| FMLOC-SiN | 0.12065 | 0.1184 | 0.0708 | 0.0918 |
| TFE3 | 0.12155 | 0.1171 | 0.0658 | 0.0904 |
| IJP | 0.3233 | 0.2255 | 0.1470 | 0.2278 |
| TFE1 | 0.1720 | 0.1184 | 0.0965 | 0.1144 |
| BP-PI | 0.2915 | 0.2775 | 0.2452 | 0.2851 |
| BF-PSA (back film adhesive) | 164.29 | 166.76 | 190.23 | 174.66 |
| BF (back film) | 0.4370 | 0.4044 | 0.3983 | 0.2709 |
| Foam | 3.6256 | 3.5654 | 2.0288 | 3.9865 |
| Pattern region | 11.869 | −0.45 | −21.16 | −36.90 |
| TPU | 12.091 | 11.001 | 10.563 | 9.358 |

A conclusion on the simulation results of outward folding R5 is as follows: simulation group BOE1 to simulation group BOE4 are compared and analyzed when the flexible display module is folded outward, it is shown that a strain of the second adhesive layer of simulation group BOE3 increases to 190%, and the second adhesive layer has a risk of failure, while the strains of other layers are within a safe range. Addition of the first transition region and the second transition region can reduce the maximum strain of the flexible support layer, and a strain of the flexible support layer in simulation group BOE4 is the lowest, which significantly reduce the failure risk of the flexible support layer.

A conclusion on the simulation results of inward folding is as follows: simulation group BOE1 to simulation group BOE4 are compared and analyzed when the flexible display module is folded inward, strains of the second adhesive layers of simulation group BOE3 and simulation group BOE4 increase to about 200%, and the second adhesive layers have a risk of failure, while the strains of other layers are within a safe range.

According to the simulation results of inward folding and outward folding, designs of simulation group BOE2 and simulation group BOE4 are verified, and a strain performance of simulation group BOE2 is the best.

An embodiment of the present disclosure provides a flexible display module, including the flexible support layer describe above.

An embodiment of the present disclosure provides a flexible display device, including the flexible display module described above. The flexible display device includes a mobile phone, a tablet computer, a smart wearable product (such as a smart watch, a bracelet), a personal digital assistant (PDA), a vehicle-mounted computer, or the like. Specific forms of the above-mentioned flexible display device are not limited in the embodiments of the present disclosure.

The drawings of the present disclosure only involve structures involved in the present disclosure, and other structures may refer to conventional designs. The embodiments in the present disclosure, i.e., features in the embodiments, may be combined with each other to obtain new embodiments if there is no conflict.

Those of ordinary skills in the art should understand that modifications or equivalent replacements may be made to the technical solutions of the present disclosure without departing from the spirit and scope of the technical solutions of the present disclosure, and shall all fall within the scope of the claims of the present disclosure.

The invention claimed is:

1. A flexible support layer, comprising two non-bending regions and one bending region connecting the two non-bending regions, wherein the bending region comprises two first transition regions and a rigid fixed region disposed between the two first transition regions, each of the two first transition regions comprises a plurality of first openings arranged at intervals, the plurality of first openings is arranged at intervals along a first direction to form a first opening row, a plurality of first opening rows are arranged at intervals along a second direction orthogonal to the first direction, wherein the second direction is a direction in which the bending region faces the non-bending region, a density of the first openings in the first transition region gradually decreases along a direction close to the non-bending region; wherein no opening is provided in the rigid fixed region, the rigid fixed region is provided with a solid support post fixedly connected with one rotating shaft, and an axis of the solid support post is parallel to an axis of the one rotating shaft in the first direction.

2. The flexible support layer according to claim 1, wherein a first interval is provided between two adjacent first openings in the first opening row, the first intervals in the same first opening row are identical, and the first intervals in each first opening row gradually increase along the second direction.

3. The flexible support layer according to claim 2, wherein first intervals in adjacent first opening rows are staggered from each other.

4. The flexible support layer according to claim 1, wherein the bending region further comprises a pattern region located between the first transition region and the rigid fixed region, the pattern region comprises a plurality of second openings arranged at intervals, and a density of the second openings in the pattern region is identical.

5. The flexible support layer according to claim 4, wherein the second openings are arranged at intervals along the first direction to form a second opening row, and a plurality of second opening rows are arranged along the second direction, and a second interval is provided between two adjacent second openings in the second opening row, the second intervals in the same second opening row are identical, and the second intervals in each second opening row are identical.

6. The flexible support layer according to claim 5, wherein the bending region further comprises a second transition region between the pattern region and the rigid fixed region, the second transition region comprises a plurality of third openings arranged at intervals, and a density of the third openings in the second transition region gradually decreases along a direction close to the rigid fixed region.

7. The flexible support layer according to claim 6, wherein the third openings are arranged at intervals along the first direction to form a third opening row, a plurality of third opening rows are arranged along the direction close to the rigid fixed region, a third interval is provided between two adjacent third openings in the third opening row, the third intervals in the same third opening row are identical, and the third intervals in each third opening row gradually increase along the direction close to the rigid fixed region.

8. The flexible support layer according to claim 7, wherein an increment of the third intervals along the direction close to the fixed region is greater than an increment of the first intervals along the second direction.

9. The flexible support layer according to claim 1, wherein each first opening is in a groove structure.

10. A flexible display module, comprising the flexible support layer according to claim 1.

11. A flexible display device, comprising the flexible display module according to claim 10.

12. A flexible support layer, comprising two non-bending regions and a bending region connecting the two non-bending regions, wherein the bending region comprises two transition regions and a rigid fixed region arranged between the two transition regions, each of the two transition regions comprises at least one pattern, wherein the rigid fixed region is provided with a solid support post fixedly connected with one rotating shaft, an axis of the solid support post is parallel to an axis of the one rotating shaft.

13. The flexible support layer according to claim 12, wherein the axis of the solid support post is parallel to the axis of the one rotating shaft in a first direction orthogonal to a second direction, wherein the second direction is a direction from the bending region towards the non-bending region.

14. The flexible support layer according to claim 12, wherein the at least one pattern comprises a plurality of first openings arranged at intervals, a density of the plurality of first openings gradually decreases along a direction from the bending region towards the non-bending region.

15. The flexible support layer according to claim 14, wherein the plurality of first openings is arranged at intervals along a first direction to form a first opening row, and a plurality of first opening rows are arranged at intervals along a second direction orthogonal to the first direction, the second direction being a direction from the bending region towards the non-bending region; wherein a first interval is provided between two adjacent first openings in the first opening row, the first intervals in the same first opening row are identical, and the first intervals in the plurality of the first opening rows gradually increase along the second direction.

16. The flexible support layer according to claim 12, wherein the at least one pattern comprises a first pattern distanced from the rigid fixed region and a second pattern located between the first pattern and the rigid fixed region; wherein the first pattern comprises a plurality of first openings arranged at intervals, a density of the plurality of first openings gradually decreasing along a direction from the bending region towards the non-bending region, the second pattern includes a plurality of second openings arranged at intervals, the plurality of second openings having a same density.

17. The flexible support layer according to claim 16, wherein the plurality of second openings is arranged along a first direction to form a second opening row, and the plurality of first opening rows is arranged along a second direction orthogonal to the first direction; wherein a second interval is provided between two adjacent second openings in the second opening row, the second intervals in the plurality of second opening rows are identical, wherein the second direction is a direction from the bending region towards the non-bending region.

18. The flexible support layer according to claim 12, wherein the at least one pattern comprises a first pattern, a second pattern, and a third pattern, the first pattern being far away from the rigid fixed region, the third pattern being close to the rigid fixed region, and the second pattern being located between the first pattern and the third pattern; wherein the first pattern comprises a plurality of first openings arranged at intervals, a density of the plurality of first openings gradually decreasing along a direction from the bending region towards the non-bending region; wherein the second pattern comprises a plurality of second openings arranged at equal intervals; wherein the third pattern comprises a plurality of third openings arranged at intervals, a density of the plurality of third openings gradually increasing along the direction from the bending region towards the non-bending region.

19. The flexible support layer according to claim 18, wherein the plurality of third openings is arranged along a first direction to form a third opening row, and a plurality of third opening rows are arranged along a second direction orthogonal to the first direction, the second direction being a direction from the bending region towards the non-bending region; wherein a third interval is provided between two adjacent third openings in the third opening row, the third intervals in the same third opening row are identical, and the third intervals in the plurality of third opening rows gradually decrease along the second direction.

20. A flexible support layer, comprising two non-bending regions and one bending region connecting the two non-bending regions, wherein the bending region comprises two first transition regions and a rigid fixed region disposed between the two first transition regions, each of the two first transition regions comprises a plurality of first openings arranged at intervals, the plurality of first openings is arranged at intervals along a first direction to form a first opening row, a plurality of first opening rows are arranged at intervals along a second direction orthogonal to the first direction, wherein the second direction is a direction in which the bending region faces the non-bending region, a density of the first openings in the first transition region gradually decreases along a direction close to the non-bending region; wherein no opening is provided in the rigid fixed region, the rigid fixed region is provided with a solid support post fixedly connected with one rotating shaft through a an adhesive layer, and an axis of the solid support post is parallel to an axis of the one rotating shaft in the first direction.

* * * * *